United States Patent
Hwang

(10) Patent No.: US 10,480,650 B2
(45) Date of Patent: Nov. 19, 2019

(54) CONTROL METHOD FOR CONTINUOUSLY VARIABLE TRANSMISSION

(71) Applicants: HYUNDAI MOTOR COMPANY, Seoul (KR); KIA MOTORS CORPORATION, Seoul (KR)

(72) Inventor: Jin Young Hwang, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 111 days.

(21) Appl. No.: 15/945,516

(22) Filed: Apr. 4, 2018

(65) Prior Publication Data

US 2019/0154145 A1    May 23, 2019

(30) Foreign Application Priority Data

Nov. 21, 2017 (KR) .......................... 10-2017-0155244

(51) Int. Cl.
*F16H 61/662* (2006.01)
*F16H 61/00* (2006.01)
*F16H 59/72* (2006.01)

(52) U.S. Cl.
CPC ....... *F16H 61/662* (2013.01); *F16H 61/0021* (2013.01); *F16H 59/72* (2013.01)

(58) Field of Classification Search
CPC .................. F16H 61/662; F16H 61/66263
See application file for complete search history.

(56) References Cited

U.S. PATENT DOCUMENTS

| | | | | |
|---|---|---|---|---|
| 5,042,323 A | * | 8/1991 | Murano | F16H 59/72 477/161 |
| 2012/0135829 A1 | * | 5/2012 | Doihara | F16H 61/66272 474/28 |
| 2016/0258531 A1 | * | 9/2016 | Ito | F16H 9/18 |

FOREIGN PATENT DOCUMENTS

| | | |
|---|---|---|
| JP | 4602207 B2 | 12/2010 |
| KR | 10-1438614 B1 | 9/2014 |
| WO | 2014-125695 A1 | 8/2014 |

* cited by examiner

*Primary Examiner* — Tisha D Lewis
(74) *Attorney, Agent, or Firm* — Brinks Gilson & Lione

(57) ABSTRACT

A control method for a continuously variable transmission is disclosed to improve shifting stability. The control method may include: determining by a controller whether a shift by controlling the pulley is required, determining whether the control of the pulley for the shift generates a pressure fluctuation which is greater than or equal to a predetermined level, calculating a required hydraulic pressure varying amount for varying a hydraulic pressure to a target hydraulic pressure, adding additional hydraulic pressure to the required hydraulic pressure varying amount so as to increase the hydraulic pressure, and decreasing the increased hydraulic pressure to the target hydraulic pressure.

11 Claims, 3 Drawing Sheets

CONTROL METHOD FOR CONTINUOUSLY VARIABLE TRANSMISSION

CROSS-REFERENCE TO RELATED APPLICATION

This application claims priority to and the benefit of Korean Patent Application No. 10-2017-0155244 filed on Nov. 21, 2017, which is incorporated herein by reference in its entirety.

FIELD

The present disclosure relates to a control method for a CVT (continuously variable transmission), and more particularly, to a control method for a CVT capable of improving stability of shifting.

BACKGROUND

The statements in this section merely provide background information related to the present disclosure and may not constitute prior art.

Generally, speed ratios of an automatic transmission or a manual transmission are fixed to constant values, and are controlled depending on driving conditions. On the other hand, a continuously variable transmission (CVT) enables speed ratios to be continuously changed within a predetermined range.

Ride comfort and acceleration performance are excellent and fuel consumption is low according to the CVT since shifting is achieved only by operating an acceleration pedal. In addition, the CVT may reduce production cost since the CVT has fewer components, compared with an automatic transmission.

However, in a CVT that is controlled by hydraulic pressure, oil viscosity is increased when the temperature of the oil is low in a low temperature region of an engine applied to the CVT, so a fluctuation of oil pressure supplied to the CVT may be strong when the viscosity is high. Therefore, if a region in which the oil pressure is lower than a required pressure exists depending on an amplitude of pressure fluctuation, the CVT may be damaged or fail as tension of a belt is not maintained.

The above information disclosed in this Background section is only for enhancement of understanding of the background of the present disclosure and therefore it may contain information that does not form the prior art that is already known to a person of ordinary skill in the art.

SUMMARY

The present disclosure provides a control method for a continuously variable transmission (CVT) having advantages of improving stability of shifting by removing a region where an oil pressure is lower than a required pressure.

In one form of the present disclosure, a control method for a CVT may control a pulley by using hydraulic pressure which controls a pulley so as to perform shifting, and the control method for a CVT may include: determining by a controller whether a shift by controlling the pulley is required; determining, by the controller, whether the control of the pulley for the shift generates a pressure fluctuation which is greater than or equal to a predetermined level; calculating, by the controller, a required hydraulic pressure varying amount for varying a hydraulic pressure to a target hydraulic pressure; adding, by the controller, an additional hydraulic pressure to the required hydraulic pressure varying amount so as to increase the hydraulic pressure; and decreasing, by the controller, the increased hydraulic pressure to the target hydraulic pressure.

The step of determining whether the shift by controlling the pulley is required may be repeatedly performed if it is determined that the shift is not required.

Normal control for supplying the target hydraulic pressure to the pulley may be performed if it is determined that the pressure fluctuation, which is greater than or equal to the predetermined level, is not generated while controlling the pulley.

The control method for a CVT may further include checking a current oil temperature.

The required hydraulic pressure varying amount for varying a hydraulic pressure to the target hydraulic pressure and a current oil temperature may be checked if the pressure fluctuation greater than or equal to the predetermined level is generated by controlling the pulley, thereby determining the additional hydraulic pressure based on the required hydraulic pressure varying amount and the current oil temperature.

The control method for a CVT may further include maintaining the hydraulic pressure by adding the additional hydraulic pressure to the target hydraulic pressure, and the hydraulic pressure formed by adding the additional hydraulic pressure to the target hydraulic pressure may be maintained in a pressure fluctuation region in which pressure fluctuation exists.

The pressure fluctuation region may be obtained from a map storing pressure fluctuation regions calculated depending on an oil temperature.

The additional hydraulic pressure may have a value obtained from a map for storing additional hydraulic pressures that are predetermined depending on a required hydraulic pressure varying amount and an oil temperature.

Decreasing the increased hydraulic pressure to the target hydraulic pressure may be gradually proceeded with a predetermined slop on a hydraulic pressure-time graph.

The predetermined slope may have a value obtained from a map storing slopes calculated based on an oil temperature.

The control method for a CVT may start when vehicle driving starts and may end when vehicle driving ends.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
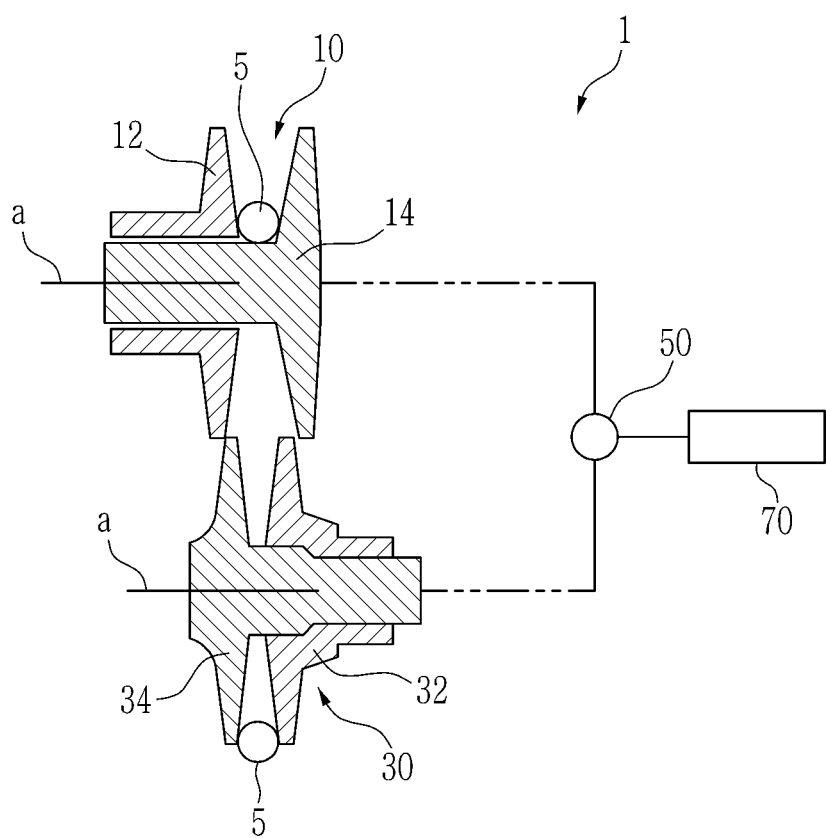
FIG. 1 is a schematic diagram of a CVT.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a schematic diagram of a CVT according to an exemplary form of the present disclosure.

As shown in FIG. 1, a CVT (continuously variable transmission) 1 includes a drive pulley 10, a driven pulley 30, a belt 5, a hydraulic pressure supply portion 50, and a controller 70.

The drive pulley 10 is connected with an input shaft of the CVT 1, and the driven pulley 30 is connected with an output shaft of the CVT 1. In addition, the driven pulley 30 is dependently rotated by rotating the drive pulley 10, and the belt 5 is disposed to surround the drive pulley 10 and the driven pulley 30 for synchronizing rotations of the drive pulley 10 and the driven pulley 30. The CVT 1 performs shifting depending on rotation ratios between the drive pulley 10 and the driven pulley 30.

For varying a rotation ratio between the drive pulley 10 and the driven pulley 30, the drive pulley 10 and the driven pulley 30 respectively include an accommodating shaft (12 and 32) having a hollow bored in a direction of a rotation axis (a) and an inserted shaft (14 and 34) inserted into the hollow. In this regard, shifting is of course possible even if the drive pulley 10 only includes the accommodating shaft 12 and the inserted shaft 14 or the driven pulley 30 only includes the accommodating shaft 32 and the inserted shaft 34.

A "V" type groove is formed between the accommodating shaft (12 and 32) and the inserted shafts (14 and 34) in disc shapes face to each other. In addition, a rotational radius of the belt 5 disposed in the "V" type groove is varied as the inserted shaft (14 or 34) is moved in a direction of the rotation axis (a) in a state of being inserted into the accommodating shaft (12 and 32). In detail, a rotational radius of the belt 5 is getting larger when the belt 5 is moved toward the outside in a radial direction when the "V" type groove is narrowed in a direction of the rotation axis (a), and a rotational radius of the belt 5 is getting smaller when the belt 5 is moved toward the inside in a radial direction when the "V" type groove is widened in a direction of the rotation axis (a). Thus, a change in the rotation ratio between the drive pulley 10 and the driven pulley 30 is achieved.

The hydraulic pressure supply portion 50 supplies hydraulic pressure which is required for moving the inserted shafts 14 and 34 in a direction of the rotation axis (a). In addition, the hydraulic pressure supply portion 50 supplies hydraulic pressure to the pulleys 10 and 30 to operate the inserted shafts 14 and 34 so as to maintain tension of the belt 5.

The controller 70 controls the hydraulic pressure supply portion 50. That is, the controller 70 controls hydraulic pressure supplied from the hydraulic pressure supply portion 50 according to a driver's demand depending on driving circumstances. The controller 70 may be an electronic control unit (ECU) generally controlling electronic devices of a vehicle.

The composition of the CVT 1 is only one example, and it is possible for a control method for a CVT to be applied to any CVT to control shifting by supplying hydraulic pressure for operating a pulley. In addition, a general composition of a CVT is well known to a person of ordinary skill in the art, so a detailed description of elements will be omitted except for elements to which control is performed by a control method for a CVT according to an exemplary form of the present disclosure.

Figure 2:
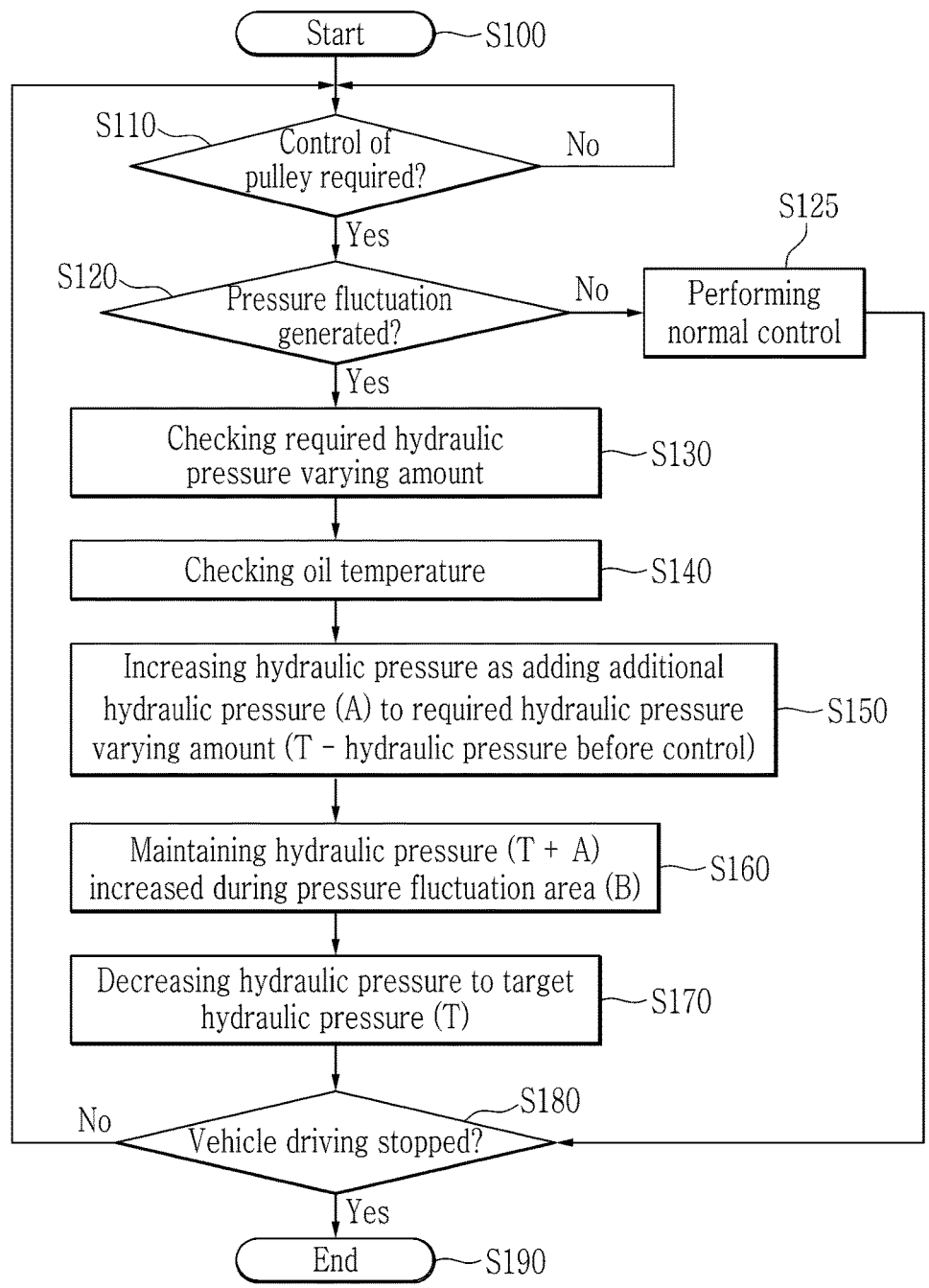
FIG. 2 is a flowchart of a control method for a CVT.
Figure 3:
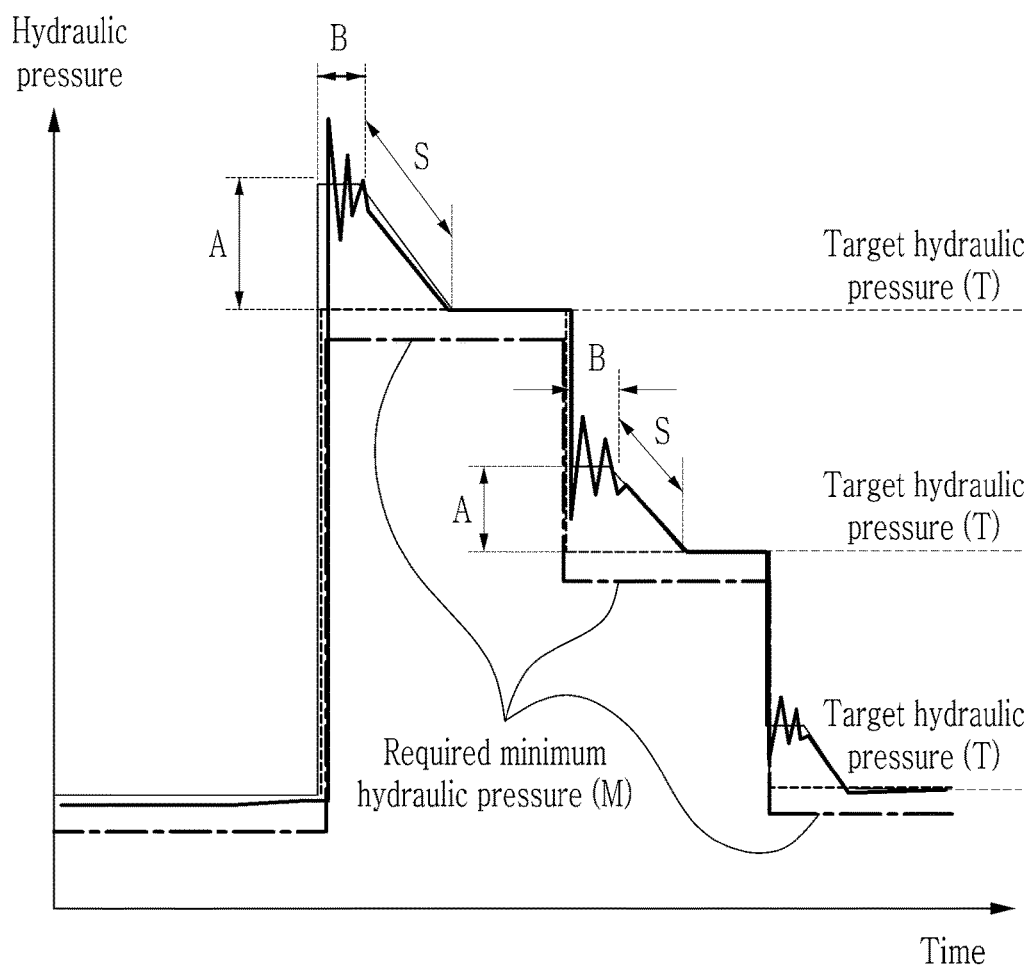
FIG. 3 is a graph regarding hydraulic pressure controlled by a control method for a CVT, and time.

FIG. 2 is a flowchart of a control method for a CVT according to an exemplary form of the present disclosure, and FIG. 3 is a graph regarding hydraulic pressure controlled by a control method for a CVT according to an exemplary form of the present disclosure, and time.

As shown in FIG. 2, if a control method for a CVT is started at step S100 together with start of vehicle driving, the controller 70 determines whether control of the pulleys 10 and 30 is required at step S110.

If it is determined that control of the pulleys 10 and 30 is not required at step S110, the step S110 of determining by the controller 70 whether control of the pulleys 10 and 30 is required is repeatedly performed.

If it is determined that shifting by controlling the pulleys 10 and 30 is required at step S110, the controller 70 determines whether the shifting generates a pressure fluctuation which is greater than or equal to a predetermined level at step S120. The pressure fluctuation, which is greater than or equal to a predetermined level, corresponds to a region where the hydraulic pressure is lower than a required minimum hydraulic pressure M while controlling the hydraulic pressure supplied to the pulleys 10 and 30 at a target hydraulic pressure T (referring to FIG. 3). Herein, the required minimum hydraulic pressure M is a minimum hydraulic pressure for realizing operation of the pulleys 10 and 30 to perform shifting. We have discovered that the region where the hydraulic pressure becomes lower than the required minimum hydraulic pressure M may occur due to pressure fluctuation even if the target hydraulic pressure T is set to be higher than the required minimum hydraulic pressure M for stability. The present disclosure addresses this problem. Meanwhile, a criterion for determining whether the pressure fluctuation is greater than or equal to the predetermined level may be a slope where hydraulic pressure of a pressure fluctuation region B, where pressure fluctuation exists, is varied in the graph regarding hydraulic pressure and time. For instance, a slope (amount of varying hydraulic pressure/time) of a variation of hydraulic pressure to generate the pressure fluctuation of greater than or equal to the predetermined level is predetermined, and it may be determined that the pressure fluctuation that is greater than or equal to the predetermined level is generated when the slope is larger than a predetermined value K of the slope.

If it is determined that the pressure fluctuation of greater than or equal to the predetermined level is not generated at step S120, normal control of supplying the target hydraulic pressure T to the pulleys 10 and 30 is performed at step S125.

If it is determined that the pressure fluctuation of greater than or equal to the predetermined level is generated at step S120, the controller 70 calculates a required amount (T−hydraulic pressure before control) of variation of hydraulic pressure from a hydraulic pressure before control to the target hydraulic pressure T at step S130 and checks a current oil temperature at step S140.

If a required hydraulic pressure varying amount (T−hydraulic pressure before control) is calculated at step S130 and the oil temperature is checked at step S140, the controller 70 increases hydraulic pressure by adding an additional hydraulic pressure A to the required hydraulic pressure varying amount (T−hydraulic pressure before control) at step S150. Thus, a value of the hydraulic pressure in a state of increasing the hydraulic pressure is value sum of the additional hydraulic pressure A and the target hydraulic pressure T. In addition, the controller 70 maintains hydraulic pressure supply at a hydraulic pressure (T+A) that is increased in the pressure fluctuation region B at step S160. Therefore, the region where the oil pressure is lower than the required minimum hydraulic pressure M in the pressure fluctuation region B is removed (referring to FIG. 3).

Meanwhile, the additional hydraulic pressure A has a value obtained from a map storing additional hydraulic pressures A that are predetermined depending on a required hydraulic pressure varying amount (T–hydraulic pressure before control) and the oil temperature. In addition, the pressure fluctuation region B is obtained from a map storing pressure fluctuation regions B that are calculated depending on oil temperature.

The controller 70 decreases the hydraulic pressure from the increased hydraulic pressure (T+A) to the target hydraulic pressure T at step S170 if the pressure fluctuation region B is passed. At this time, the hydraulic pressure is gradually decreased such that a graph of a hydraulic pressure has a sloping area S. The reduction of the hydraulic pressure making the sloping area S is for inhibiting or preventing another pressure fluctuation which may occur when the hydraulic pressure is rapidly decreased. In this regard, a slope of the sloping area S has a value obtained from a map storing slopes that are calculated depending on oil temperature so as to inhibit or prevent another pressure fluctuation and is smaller than the predetermined value K.

The maps are stored in the controller 70 based on repeated experiments and studies which are performed many times.

If controlling the hydraulic pressure to the target hydraulic pressure T is completed at step S170, the controller 70 determines whether vehicle driving has stopped at step S180. In addition, if the normal control is completed at step S125, the controller 70 determines whether the vehicle driving has stopped at step S180.

If it is determined that the vehicle driving has stopped at step S180, the control method for a CVT is ended at step S190.

If it is determined that the vehicle driving has not stopped at step S180, the control method for a CVT is performed again from step S110.

According to an exemplary form of the present disclosure, stability of shifting may be improved as a region in which oil pressure is lower than the required minimum hydraulic pressure M is removed. In addition, damage to the pulleys 10 and 30 and a failure of the CVT 1 can be reduced or inhibited, and noise when shifting may be reduced. Further, fuel consumption may be improved in comparison with control of increasing the oil pressure in the entire region for removing the region where the oil pressure is lower than the required minimum hydraulic pressure M.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

1: CVT
5: belt
10: drive pulley
12, 32: accommodating shaft
14, 34: inserted shaft
30: driven pulley
50: hydraulic pressure supply portion
70: controller

What is claimed is:

1. A control method for a continuously variable transmission (CVT), which controls a pulley by using hydraulic pressure so as to perform shifting, the control method comprising:
    determining, by a controller, whether a shift by controlling the pulley is required;
    determining, by the controller, whether the control of the pulley for the shift generates a pressure fluctuation which is greater than or equal to a predetermined level;
    calculating, by the controller, a required hydraulic pressure varying amount for varying a hydraulic pressure to a target hydraulic pressure;
    adding, by the controller, an additional hydraulic pressure to the required hydraulic pressure varying amount so as to increase the hydraulic pressure; and
    decreasing, by the controller, the increased hydraulic pressure to the target hydraulic pressure.

2. The control method of claim 1, wherein the step of determining whether the shift is required is repeatedly performed when the shift is not required.

3. The control method of claim 1, wherein normal control for supplying the target hydraulic pressure to the pulley is performed when the pressure fluctuation is less than the predetermined level.

4. The control method of claim 1, further comprising a step of checking a current oil temperature.

5. The control method for a CVT of claim 4, wherein the required hydraulic pressure varying amount is calculated and the current oil temperature is checked when the pressure fluctuation is greater than or equal to the predetermined level, and the additional hydraulic pressure is calculated based on the required hydraulic pressure varying amount and the current oil temperature.

6. The control method of claim 1, further comprising a step of maintaining the hydraulic pressure formed by adding the additional hydraulic pressure to the target hydraulic pressure,
    wherein the hydraulic pressure formed by adding the additional hydraulic pressure to the target hydraulic pressure is maintained in a pressure fluctuation region in which the pressure fluctuation exists.

7. The control method of claim 6, wherein the pressure fluctuation region is obtained from a map storing pressure fluctuation regions calculated depending on an oil temperature.

8. The control method of claim 1, wherein the additional hydraulic pressure has a value obtained from a map storing additional hydraulic pressures that are predetermined based on the required hydraulic pressure varying amount and an oil temperature.

9. The control method of claim 1, wherein the step of decreasing the increased hydraulic pressure to the target hydraulic pressure is gradually proceeded with a predetermined slope on a hydraulic pressure-time graph.

10. The control method of claim 9, wherein the predetermined slope has a value obtained from a map storing slopes calculated based on an oil temperature.

11. The control method of claim 1, wherein the control method for the CVT starts together with start of a vehicle driving and ends together with end of the vehicle driving.

* * * * *